United States Patent
Ren et al.

(10) Patent No.: US 8,336,653 B2
(45) Date of Patent: Dec. 25, 2012

(54) HYBRID POWER DRIVE SYSTEM AND DRIVE METHOD

(75) Inventors: Yi Ren, Shenzhen (CN); Ruru Niu, Shenzhen (CN)

(73) Assignee: BYD Co. Ltd. (CN)

(*) Notice: Subject to any disclaimer, the term of this patent is extended or adjusted under 35 U.S.C. 154(b) by 495 days.

(21) Appl. No.: 12/547,683

(22) Filed: Aug. 26, 2009

(65) Prior Publication Data

US 2010/0051362 A1 Mar. 4, 2010

(30) Foreign Application Priority Data

Aug. 28, 2008 (CN) .......................... 2008 1 0146430

(51) Int. Cl.
*B60K 1/02* (2006.01)

(52) U.S. Cl. ....... 180/65.6; 180/65.265; 477/5; 903/909

(58) Field of Classification Search ............... 180/65.22, 180/65.265, 65.25, 65.6; 477/5; 903/909, 903/910, 911
See application file for complete search history.

(56) References Cited

U.S. PATENT DOCUMENTS

| | | | | |
|---|---|---|---|---|
| 5,202,617 A * | 4/1993 | Nor | .............................. | 320/130 |
| 6,007,451 A * | 12/1999 | Matsui et al. | .................... | 477/19 |
| 6,569,055 B2 * | 5/2003 | Urasawa et al. | ................... | 477/5 |
| 6,685,591 B2 * | 2/2004 | Hanyu et al. | ..................... | 475/5 |
| 7,163,480 B2 * | 1/2007 | Supina et al. | ..................... | 475/5 |
| 7,264,070 B2 * | 9/2007 | Shimizu | ..................... | 180/65.25 |
| 7,395,889 B2 * | 7/2008 | Sugiyama et al. | ....... | 180/65.285 |
| 7,819,212 B2 * | 10/2010 | Kawasaki | ................ | 180/65.265 |
| 7,909,729 B2 * | 3/2011 | Tanaka et al. | ..................... | 477/8 |

FOREIGN PATENT DOCUMENTS

| | | |
|---|---|---|
| CN | 100999190 | 7/2007 |
| CN | 201296159 | 8/2009 |
| EP | 1 433 641 A1 | 6/2004 |
| JP | 2006069386 | 3/2006 |
| WO | WO 2008/027224 A2 | 3/2008 |

OTHER PUBLICATIONS

International Search Report dated Dec. 3, 2009 issued with regard to PCT Publication No. PCT/CN2009/073627.

* cited by examiner

*Primary Examiner* — John Walters
(74) *Attorney, Agent, or Firm* — Brinks Hofer Gilson & Lione

(57) ABSTRACT

A hybrid power drive system includes an engine, a first motor, a first clutch operatively coupled between the engine and the first motor, a first decelerating mechanism having an input portion operatively coupled between the first clutch and the first motor, where the input portion is configured to receive rotational power from the first motor and/or the engine. The first decelerating mechanism has an output portion operative to drive at least one first wheel, and a second motor is operatively coupled to at least one second wheel through a second decelerating mechanism. An energy storage device is coupled separately to the first motor and to the second motor. The engine, the first clutch and the first motor are connected in sequence, and the second decelerating mechanism and the at least one second wheel are connected in sequence. Various combinations of operating modes are provided to meet energy efficiency requirements and user power demands.

17 Claims, 18 Drawing Sheets

Engine Driving Mode of One Specific Embodiment

First Motor Driving Mode of One Specific Embodiment

Engine and First Motor Driving Mode of One Specific Embodiment

Second Motor Driving Mode of One Specific Embodiment

Engine and Second Motor Driving Mode of One Specific Embodiment

First Motor and Second Motor Driving Mode of One Specific Embodiment

Engine and Dual Motors Driving Mode of One Specific Embodiment

Engine Driving Mode of Another Embodiment

Engine and First Motor Driving Mode of Another Embodiment

Second Motor Driving Mode of Another Embodiment

Engine and Second Motor Driving Mode of Another Embodiment

First Motor and Second Motor Driving Mode of Another Embodiment

HYBRID POWER DRIVE SYSTEM AND DRIVE METHOD

CROSS-REFERENCE TO RELATED APPLICATIONS

This application claims the benefit of priority to Chinese Patent Application No. 2008-10146430.9, filed on Aug. 28, 2008, which is incorporated by reference herein in its entirety.

FIELD OF TECHNOLOGY

This application relates to a hybrid power drive system and drive method.

BACKGROUND OF THE INVENTION

Hybrid power automobiles have the power advantages of both the pure-electric vehicles and the traditional vehicles, and provide excellent energy savings, while also helping to conserve the environment. However, current hybrid power automobiles mostly are front-wheel drive or back-wheel drive, thus only two wheels (one axel) typically provide power. When the vehicles travel on rough roads, such as in off-road and cross-country travel, the drive system cannot provide the required power and handling requirements. Thus, current hybrid power drive systems are limited.

SUMMARY

This application discloses a hybrid power drive system. The drive system has many four-wheel drive modes and may provide more strong power to the vehicles.

A hybrid power drive system comprises an engine, a first motor, a first clutch operatively coupled between the engine and the first motor, a first decelerating mechanism, a second motor operatively coupled to at least one second wheel through a second decelerating mechanism, and an energy storage device coupled separately to the first motor and to the second motor. The first decelerating mechanism has an input portion operatively coupled between the first clutch and the first motor. The input portion configured to receive rotational power from the first motor and/or the engine. The first decelerating mechanism has an output portion operative to drive at least one first wheel. The engine, the first clutch and the first motor are connected in sequence, and the second decelerating mechanism and at least one second wheels are connected in sequence.

A drive method of the hybrid power drive system may control the drive system in many four-wheel drive modes to provide more strong power to the vehicles.

A drive method of a hybrid power drive system, the drive system comprises an engine, a first motor, a first clutch operatively coupled between the engine and the first motor, a first decelerating mechanism, a second motor operatively coupled to at least one second wheel through a second decelerating mechanism, and an energy storage device coupled separately to the first motor and to the second motor. The first decelerating mechanism has an input portion operatively coupled between the first clutch and the first motor. The input portion configured to receive rotational power from the first motor and/or the engine. The first decelerating mechanism has an output portion operative to drive at least one first wheel. The engine, the first clutch and the first motor are connected in sequence, and the second decelerating mechanism and at least one second wheels are connected in sequence. And, the drive method comprises the following steps: providing an engine driving mode, providing a first motor driving mode, providing an engine and first motor driving mode, providing a second motor driving mode, providing an engine and second motor driving mode, providing a first motor and second motor driving mode and providing an engine and dual motor driving mode.

The structure of the hybrid power drive system is simple. The drive method may comprise many two-wheel drive modes and four-wheel drive modes, so it can provide more strong power to the vehicles to meet its required power. Further, it is possible to apply this hybrid power drive system in the cross-country vehicles.

DETAILED DESCRIPTION OF THE PREFERRED EMBODIMENT

The detailed embodiments will be described with the drawings.

Figure 1:
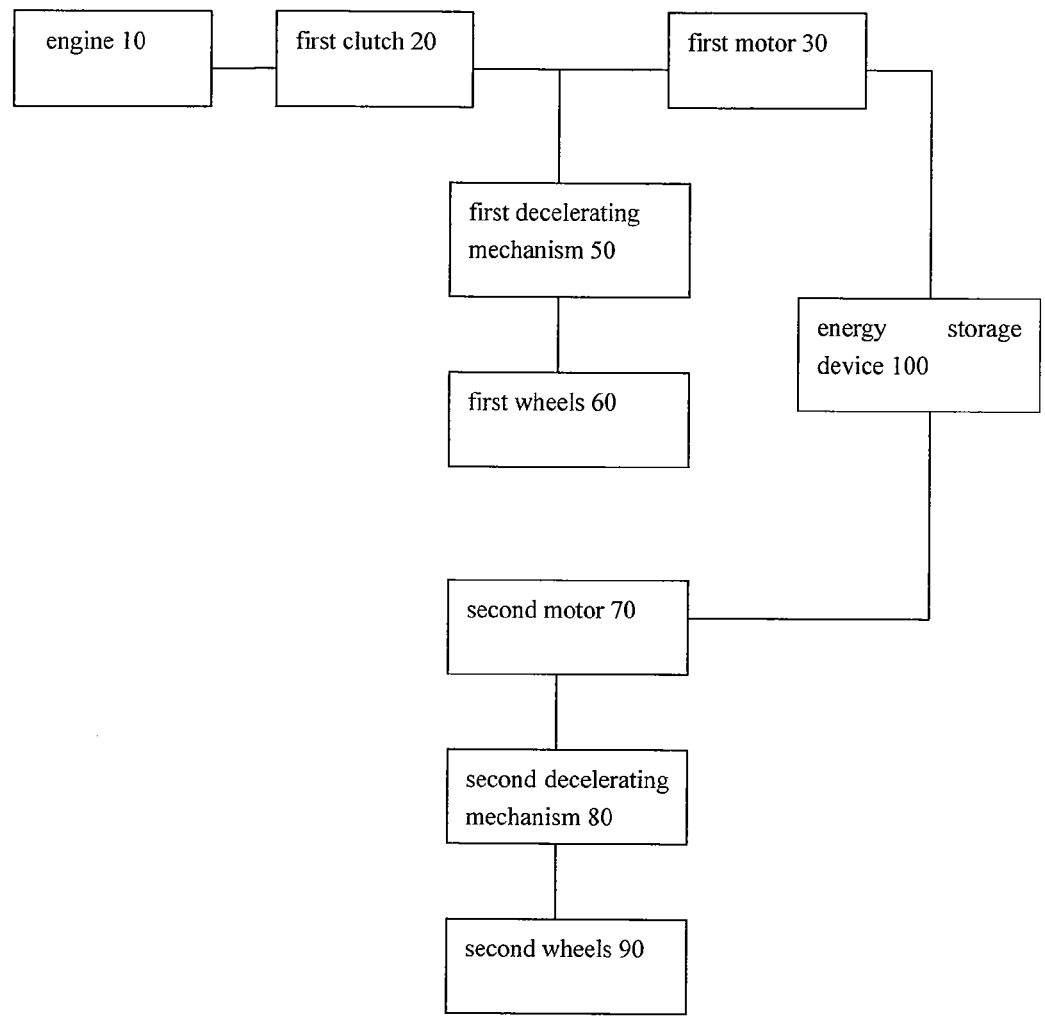
FIG. 1 is a schematic block diagram of a hybrid power drive system of one specific embodiment.

According to FIG. 1, in one embodiment, a hybrid power drive system comprises an engine 10, a first motor 30, a first clutch 20 operatively coupled between the engine and the first motor, a first decelerating mechanism 50, a second motor 70 operatively coupled to at least one second wheel 90 through a second decelerating mechanism, and an energy storage device 100 coupled separately to the first motor and to the second motor. The first decelerating mechanism 50 has an input portion operatively coupled between the first clutch 20 and the first motor 30, the input portion configured to receive rotational power from the first motor 30 and/or the engine 10. The first decelerating mechanism 50 has an output portion operative to drive at least one first wheel 60. The engine 10, the first clutch 20 and the first motor 30 are connected in sequence; the second decelerating mechanism 80 and at least one second wheel 90 are connected in sequence.

The engine 10 may be gasoline engine, diesel engine, or other fuel engines using methanol, ethanol, etc.

The first clutch 20 may be a clutch commonly known by those skilled in the art.

The first motor 30 and the second motor 70 may be AC motors, switched reluctance motors, DC permanent magnet motors, etc. According to the electromagnetic induction principle, the first motor 30 and the second motor 70 can work in a generator mode or in a motor mode. When in the generator mode, the motors 30, 70 translate the mechanical energy into the electricity energy. When works in the motor mode, the motors 30, 70 translate the electricity energy into the mechanical energy. For example, when the power of the engine 10 is transferred to the first motor 30 through the engaged first clutch 20, the first motor 30 works in the generator mode, thus the first motor 30 translate the mechanical energy into the electricity energy, and the electricity energy is transferred to the energy storage device 100 to charge it accordingly. While the drive system runs in the braking mode and the braking energy fed back from at least one first wheel and/or at least one second wheel is transferred respectively to the first motor 30 and/or the second motor 70, the first motor 30 and/or the second motor 70 works in the generator mode, thus the mechanical energy is transferred into the electricity energy and is transferred to the energy storage device 100 to charge it accordingly. While the energy storage device 100 provides the electricity power to the first motor 30 and the second motor 70, both the first motor 30 and the second motor 70 work in the motor mode, thus the electricity energy is transferred into the mechanical energy to drive at least one wheel to run.

The first decelerating mechanism 50 and the second decelerating mechanism 80 may be decelerating gears, transmissions, etc. And as those skilled in the art knows, the power transferred from the first decelerating mechanism 50 and the second decelerating mechanism 80 may be separately transferred to the first wheels 60 and the second wheels 90 through the shaft coupling, the wheels drive shaft, etc. to drive the vehicle to run.

The energy storage device 100 may be rechargeable energy source, such as a storage battery pack, a fuel battery pack, etc.

The drive system may has a plurality of modes including an engine driving mode, a first motor driving mode, an engine and first motor driving mode, a second motor driving mode, an engine and second motor driving mode, a first motor and second motor driving mode and an engine and dual motors driving mode.

Figure 3:
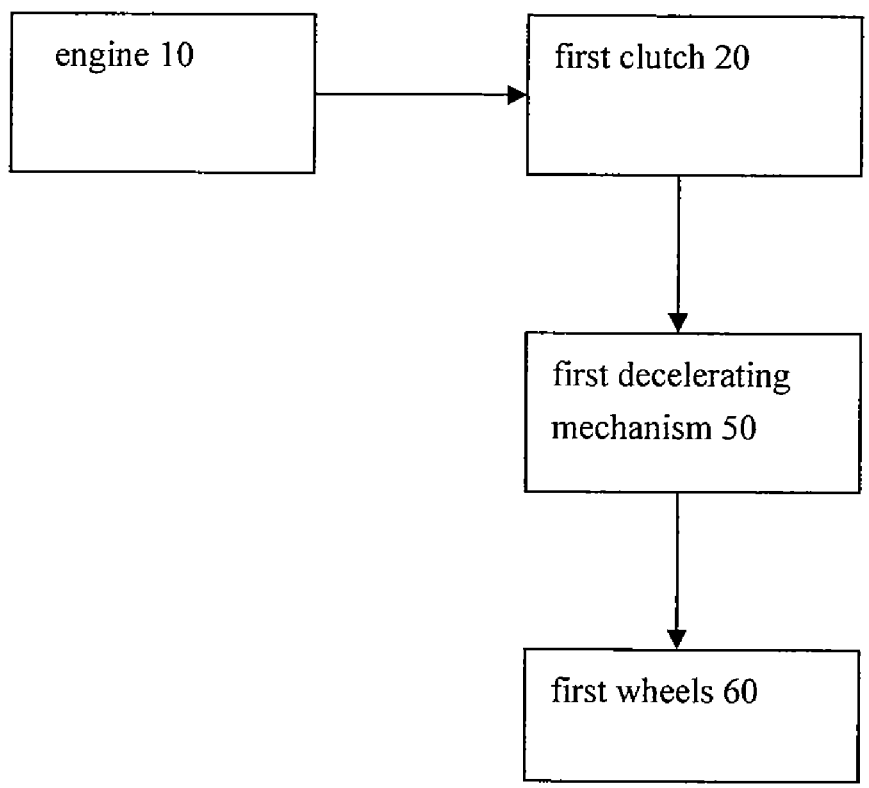
FIG. 3 is a schematic block diagram of an engine driving mode of a hybrid power drive system of one specific embodiment.

In the engine driving mode as shown in FIG. 3, at least one first wheel 60 drives the vehicle to run, the engine 10 is a power resource. The engine 10 starts, the first clutch 20 is engaged, the rotational power of the engine 10 is transferred to at least one first wheel 60 through the first clutch 20 and the first decelerating mechanism 50 to drive the vehicle to run.

Figure 4:
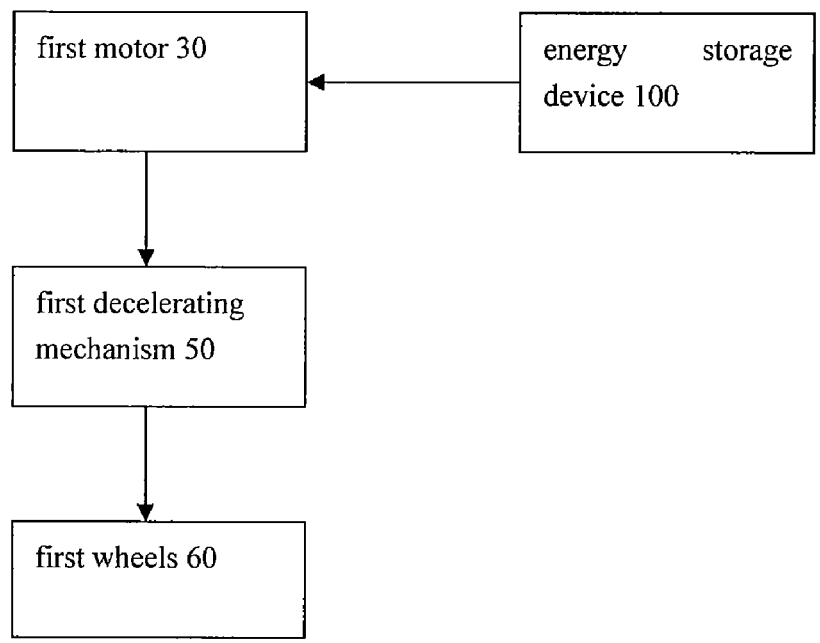
FIG. 4 is a schematic block diagram of a first motor driving mode of a hybrid power drive system of one specific embodiment.

In the first motor driving mode as shown in FIG. 4, at least one first wheel 60 drives the vehicle to run, the first motor 30 is a power resource. The energy storage device 100 provides electricity power to the first motor 30, the power of the motor 30 is transferred to at least one first wheel 60 through the first decelerating mechanism 50 to drive the vehicle to run.

Figure 5:
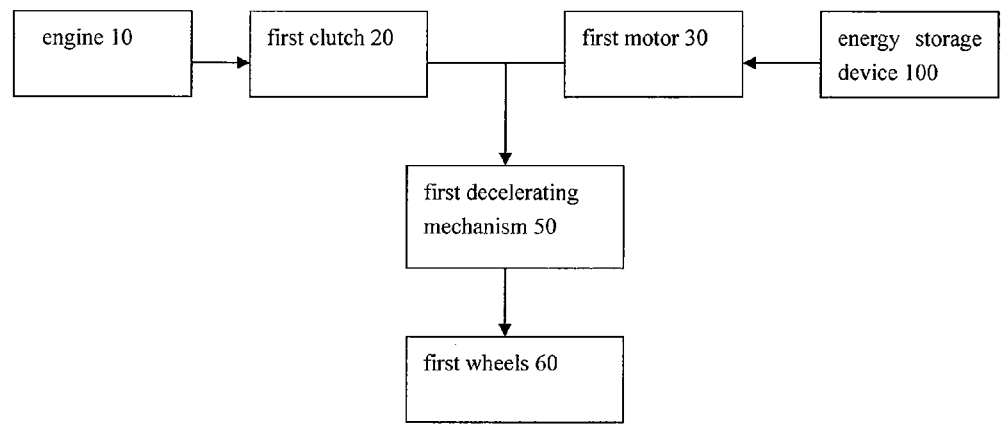
FIG. 5 is a schematic block diagram of an engine and first motor driving mode of a hybrid power drive system of one specific embodiment.

In the engine and first motor driving mode as shown in FIG. 5, at least one first wheel 60 drives the vehicle to run, the engine 10 and first motor 30 both are power resources. The engine 10 starts, the first clutch 20 is engaged, the power of the engine 10 is transferred to at least one first wheel 60 through the first clutch 20 and the first decelerating mechanism 50 to drive the vehicle to run. Meanwhile, the energy storage device 100 provides electricity power to the first motor 30, the power of the first motor 30 is transferred to the at least one first wheel 60 through the first decelerating mechanism 50 to drive the vehicle to run.

Figure 6:
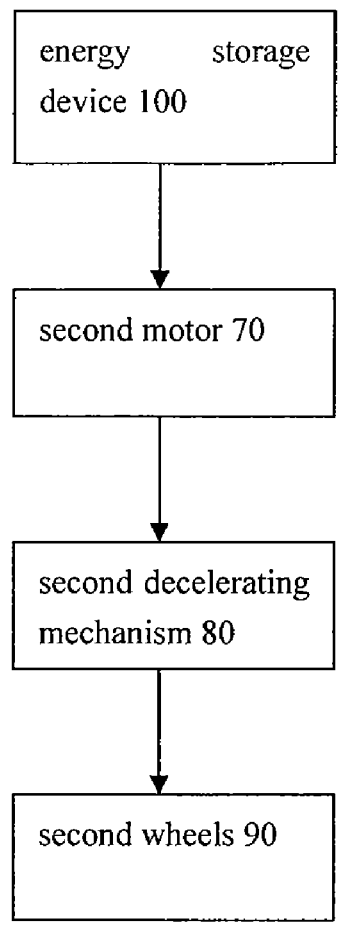
FIG. 6 is a schematic block diagram of a second motor driving mode of a hybrid power drive system of one specific embodiment.

In the second motor driving mode as shown in FIG. 6, the vehicle is driven by at least one second wheel 90, the second motor 70 is a power resource. The energy storage device 100 provides electricity power to the second motor 70, the power of the motor 70 is transferred to at least one second wheel 90 through the second decelerating mechanism 80 to drive the vehicle to run.

Figure 7:
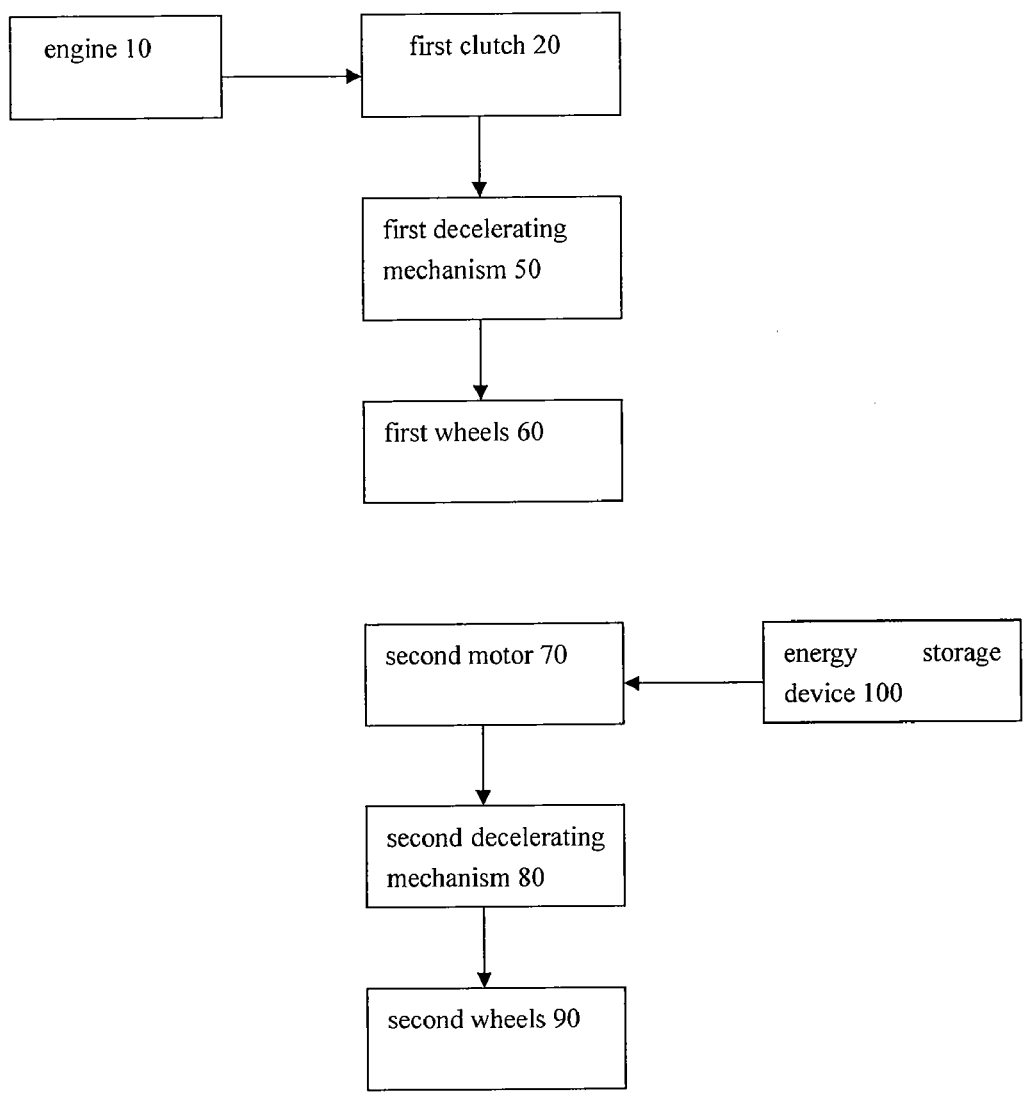
FIG. 7 is a schematic block diagram of an engine and second motor driving mode of a hybrid power drive system of one specific embodiment.

In the engine and second motor driving mode as shown in FIG. 7, the vehicle is driven by at least one first wheel 60 and/or at least one second wheel 90, namely four-wheel driving. The engine 10 and the second motor 70 both are power resources. The engine 10 starts, the first clutch 20 is engaged, the power of the engine 10 is transferred to at least one first wheel 60 through the first clutch 20 and the first decelerating mechanism 50 to drive the vehicle to run. Meanwhile, the energy storage device 100 provides electricity power to the second motor 70, the power of the second motor 70 is transferred to at least one second wheel 90 through the second decelerating mechanism 80 to drive the vehicle to run.

Figure 8:
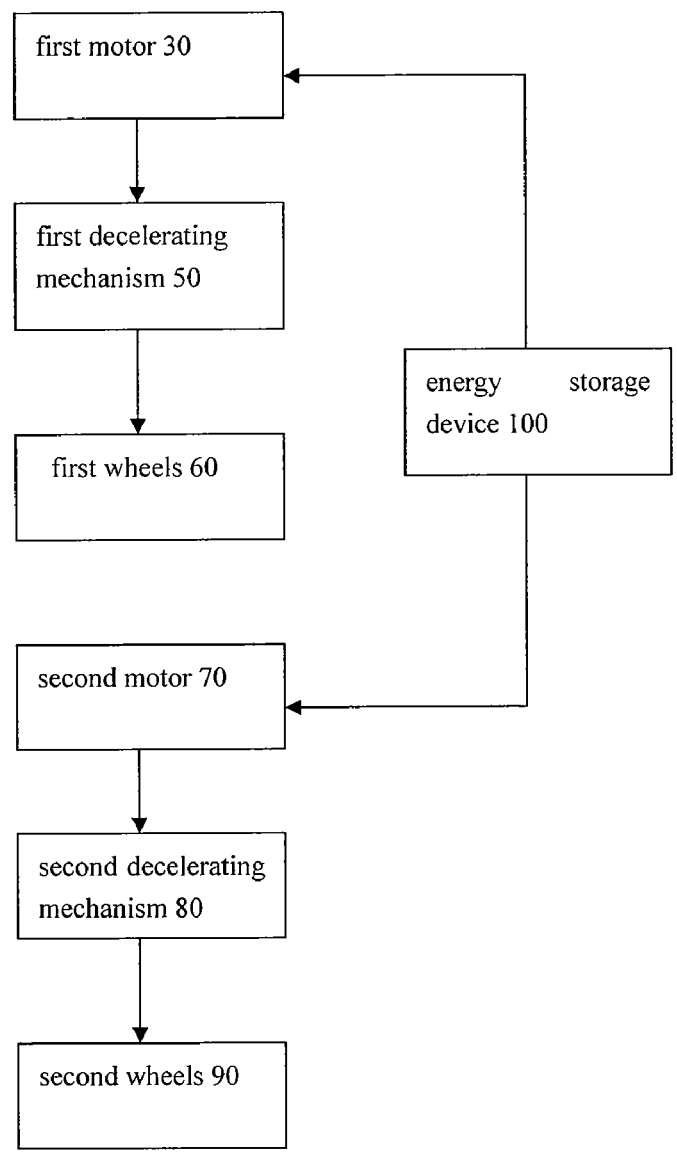
FIG. 8 is a schematic block diagram of a first motor and second motor driving mode of a hybrid power drive system of one specific embodiment.

In the first motor and second motor driving mode as shown in FIG. 8, the vehicle is driven by at least one first wheel 60 and/or at least one second wheel 90, namely four-wheel driving. The first motor 30 and the second motor 70 both are power resources. The energy storage device 100 simultaneously provides electricity power to the first motor 30 and the second motor 70. The power of the first motor 30 is transferred to at least one first wheel 60 through the first decelerating mechanism 50 to drive the vehicle; the power of the second motor 70 is transferred to at least one second wheel 90 through the second decelerating mechanism 80 to drive the vehicle.

Figure 9:
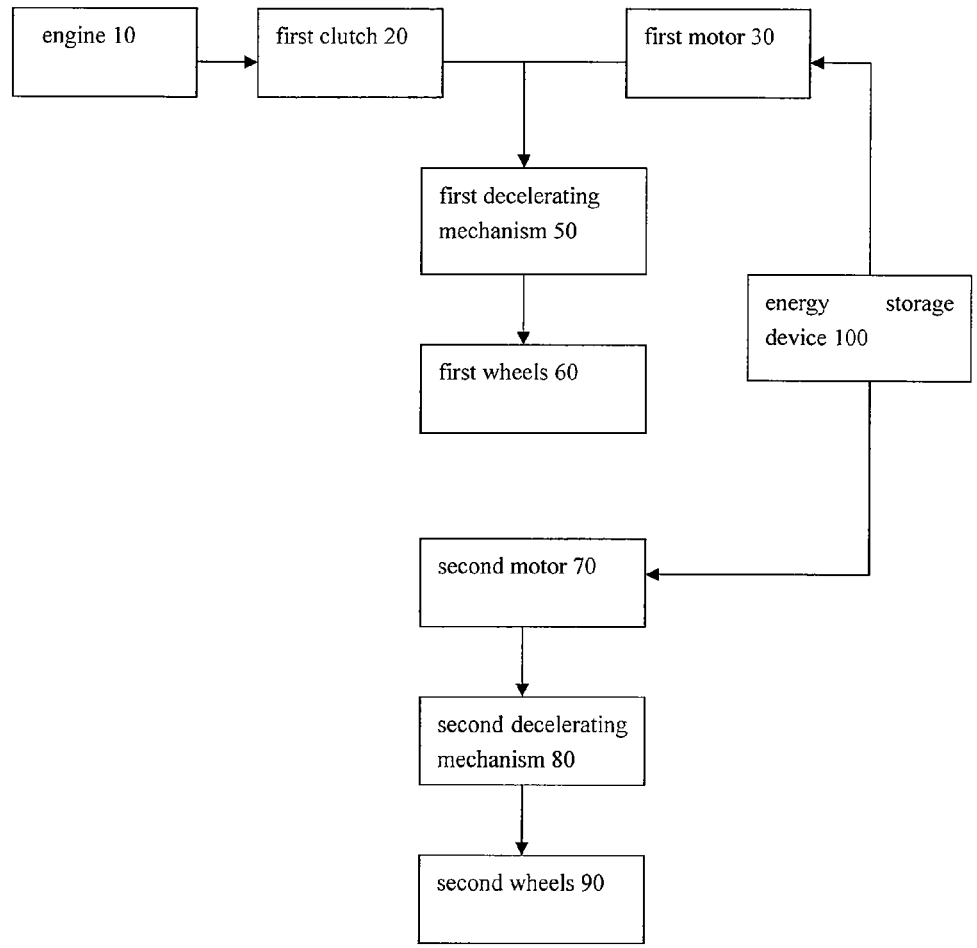
FIG. 9 is a schematic block diagram of an engine and dual motors driving mode of a hybrid power drive system of one specific embodiment.

In the engine and dual motors driving mode as shown in FIG. 9, the vehicle is driven by at least one first wheel 60 and/or at least one second wheel 90. The engine 10, the first motor 30 and the second motor 70 all function as synchronous power resources. The engine 10 starts, the first clutch 20 is engaged, the power of the engine 10 is transferred to at least one first wheel 60 through the first clutch 20 and the first decelerating mechanism 50 to drive the vehicle. Meanwhile, the energy storage device 100 simultaneously provides electricity power to the first motor 30 and the second motor 70. The power of the first motor 30 is transferred to the first wheels through the first decelerating mechanism 50 to drive the vehicle; the power of the second motor 70 is transferred to at least one second wheel 90 through the second decelerating mechanism 80 to drive the vehicle.

Figure 2:
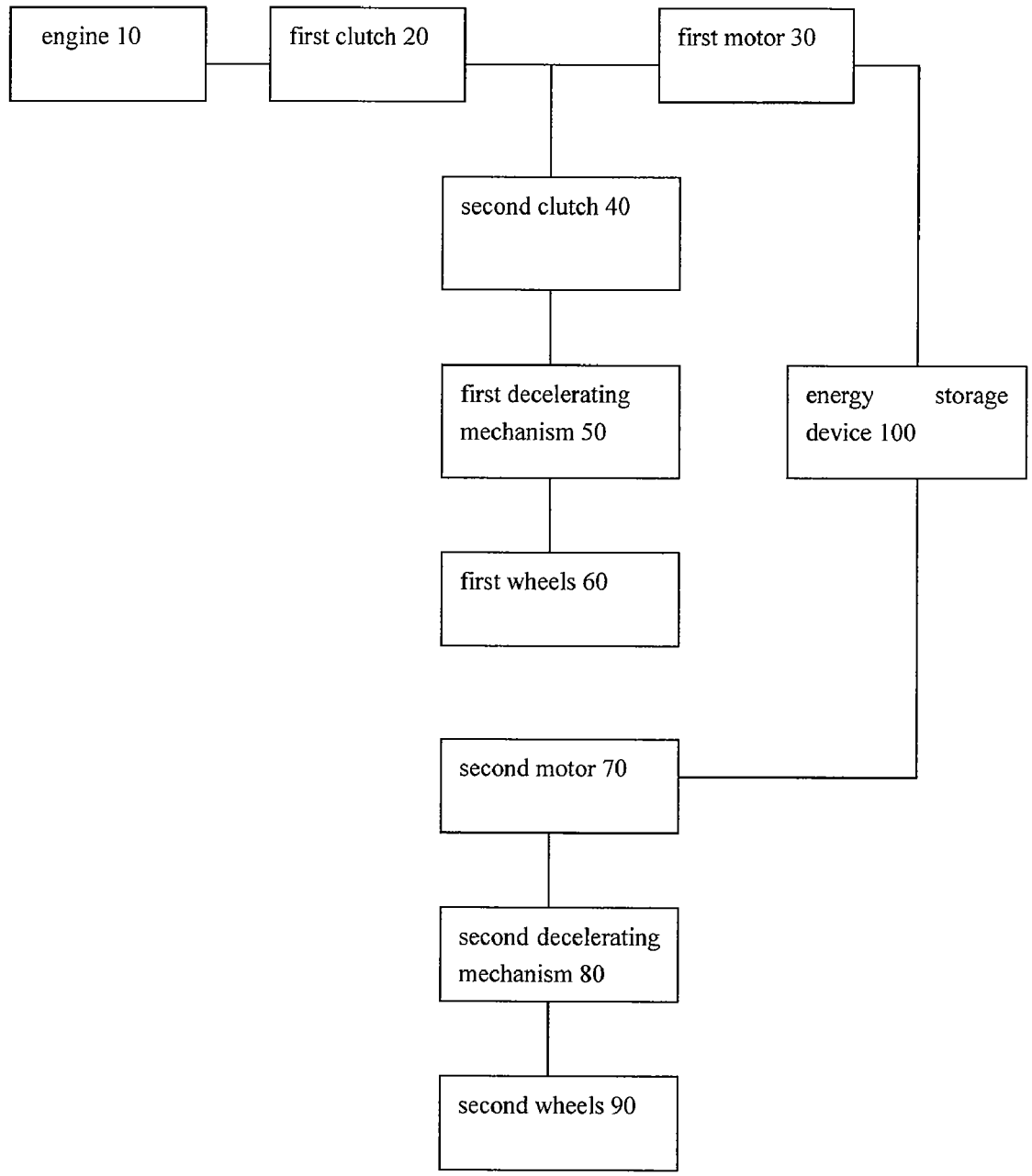
FIG. 2 is a schematic block diagram of a hybrid power drive system according to another embodiment.

FIG. 2 shows the principle of another embodiment of the hybrid power drive system. The difference from FIG. 1 lies in that the drive system further comprises a second clutch 40 operatively coupled between the first clutch 20 and the first motor 30, and operatively coupled to the first decelerating mechanism, in addition to the components shows in FIG. 1. The second clutch 40 may be a clutches commonly known by those skilled in the art.

In this embodiment, the engine 10, the first clutch 20 and the first motor 30 are connected in sequence. The second clutch 40 is connected between the first clutch 20 and the first motor 30. The second clutch 40, the first decelerating mechanism 50 and the first sets of wheels 60 are connected in sequence. The second motor 70, the second decelerating mechanism 80 and the second sets of wheels 90 are connected in sequence. The energy storage device 100 is electrically connected with the first motor 30 and the second motor 70 separately, as FIG. 2 shows.

Figure 10:
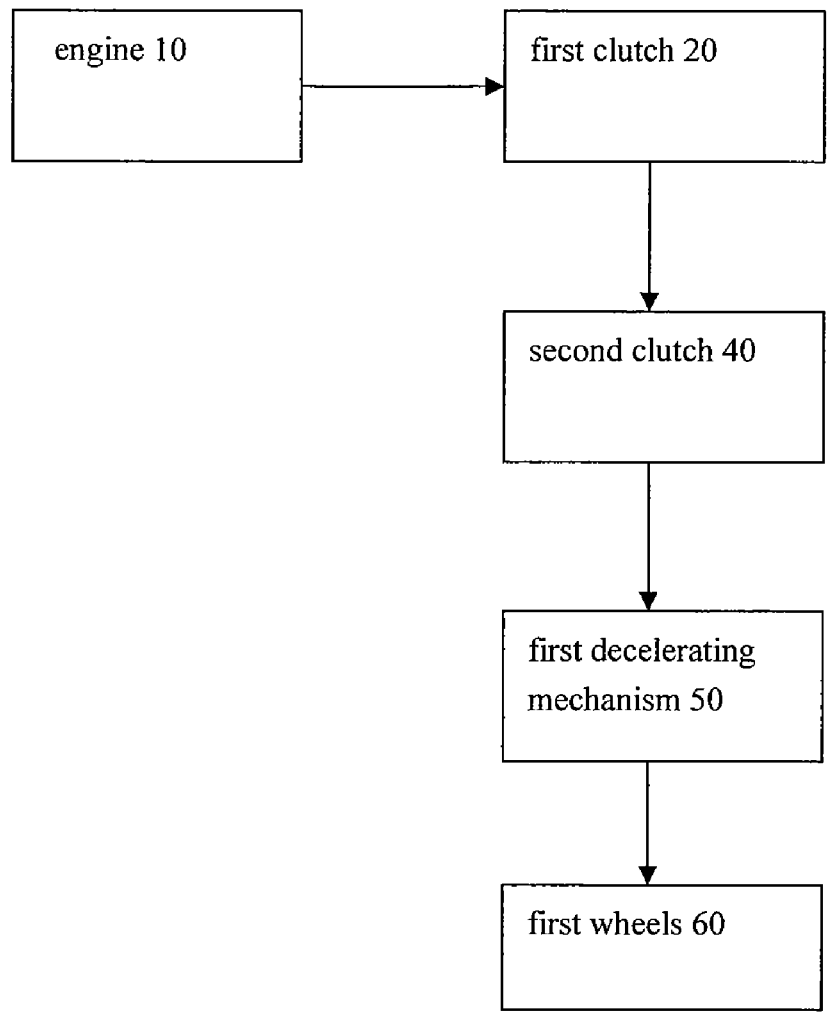
FIG. 10 is a schematic block diagram of an engine driving mode of a hybrid power drive system of another embodiment.
Figure 11:
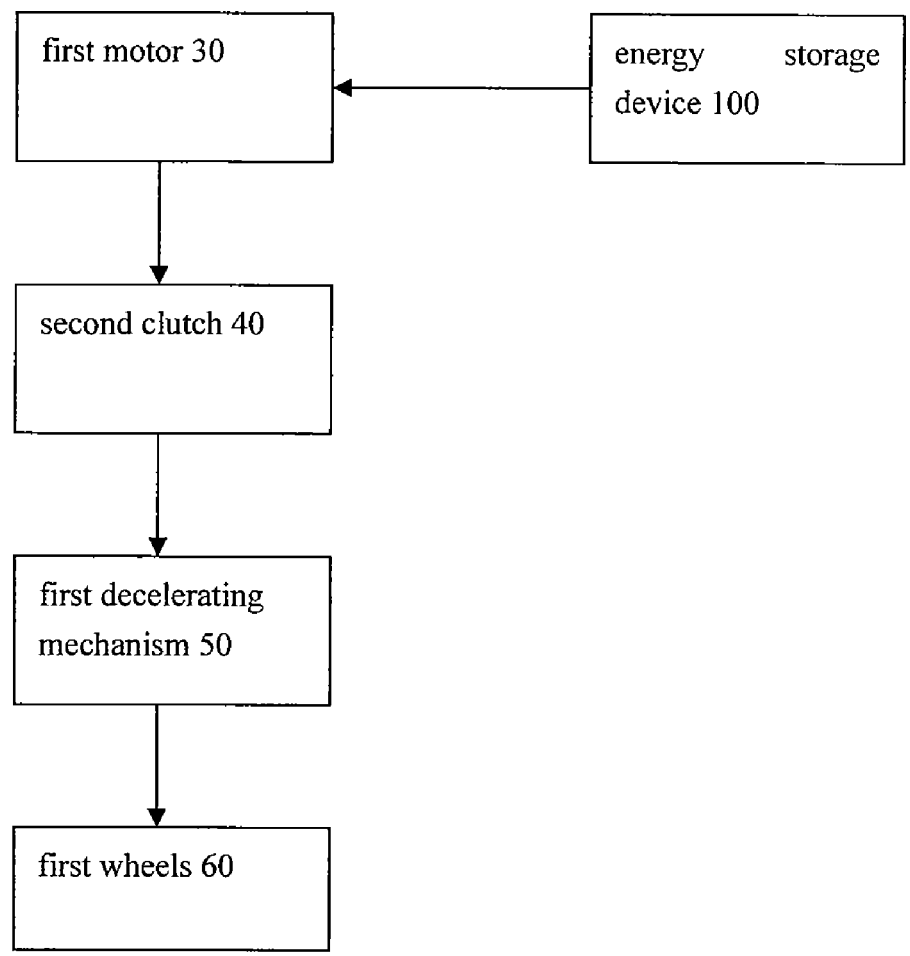
FIG. 11 is a schematic block diagram of a first motor driving mode of a hybrid power drive system of another embodiment.
Figure 12:
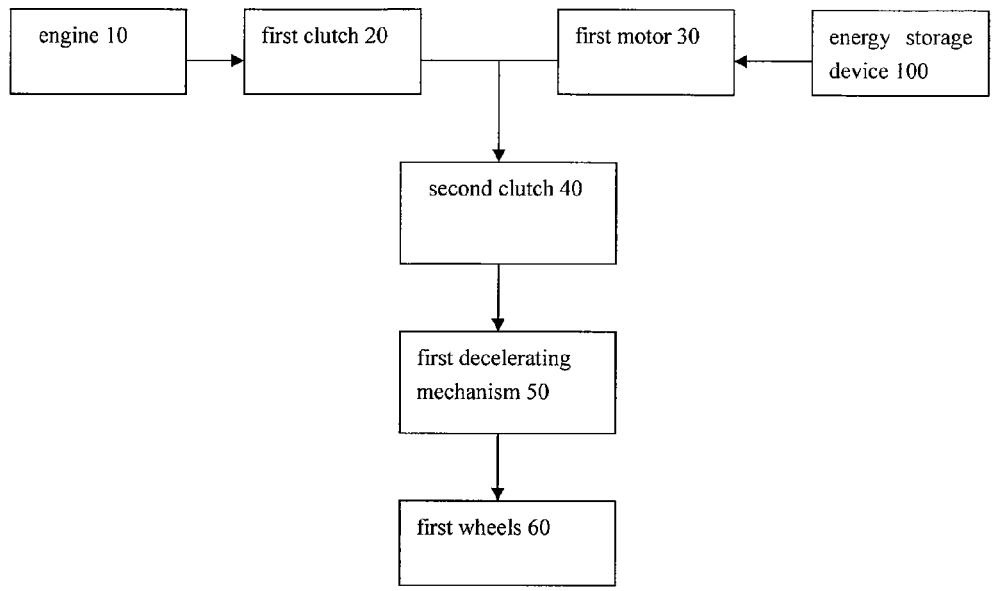
FIG. 12 is a schematic block diagram of an engine and first motor driving mode of a hybrid power drive system of another embodiment.
Figure 13:
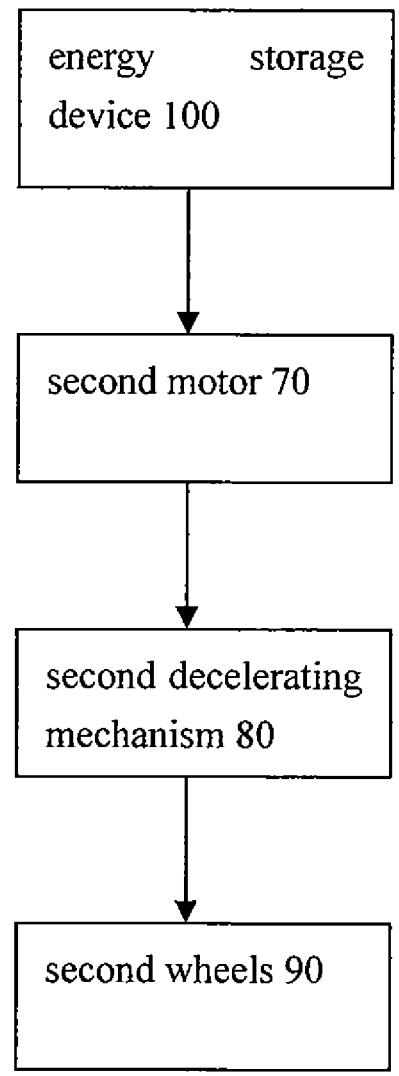
FIG. 13 is a schematic block diagram of a second motor driving mode of a hybrid power drive system of another embodiment.
Figure 14:
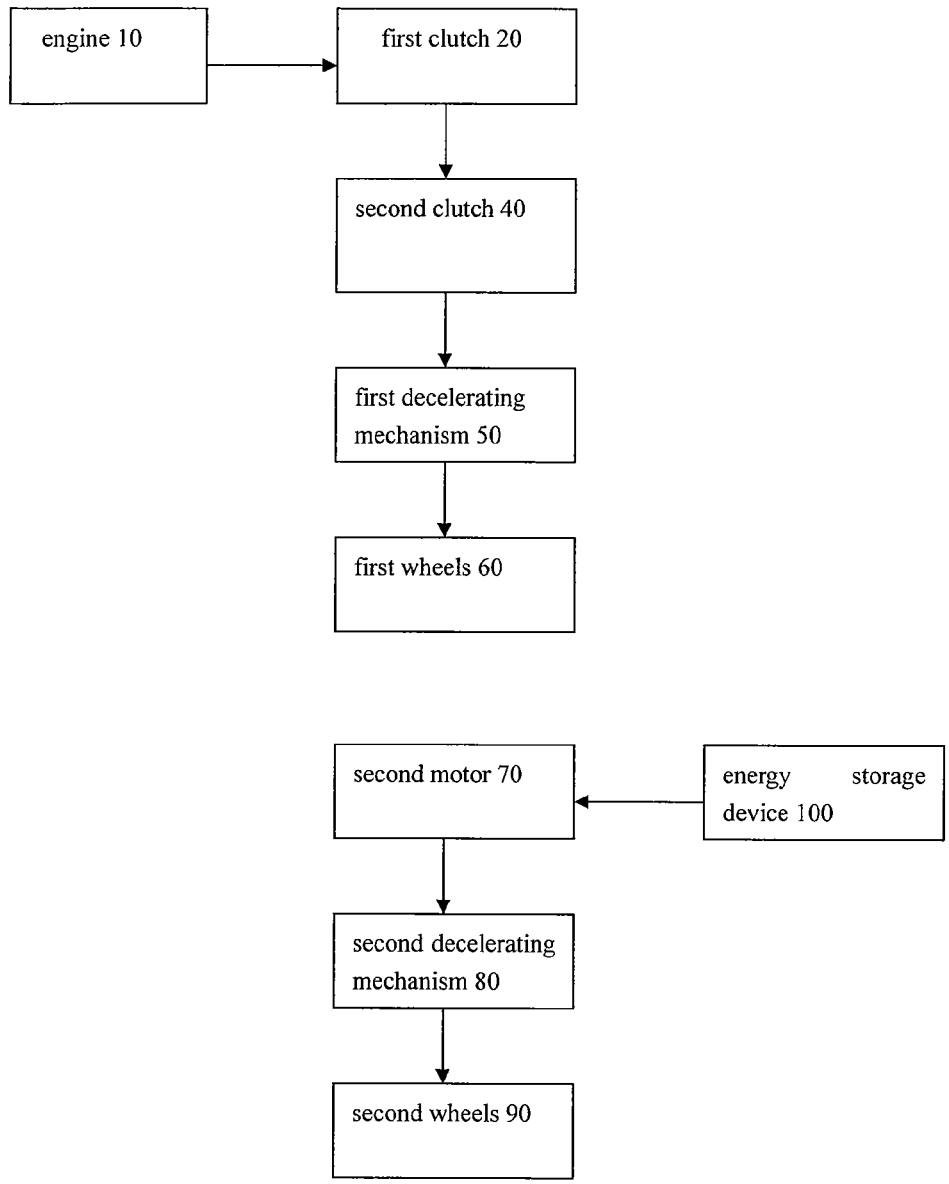
FIG. 14 is a schematic block diagram of an engine and second motor driving mode of a hybrid power drive system of another embodiment.
Figure 15:
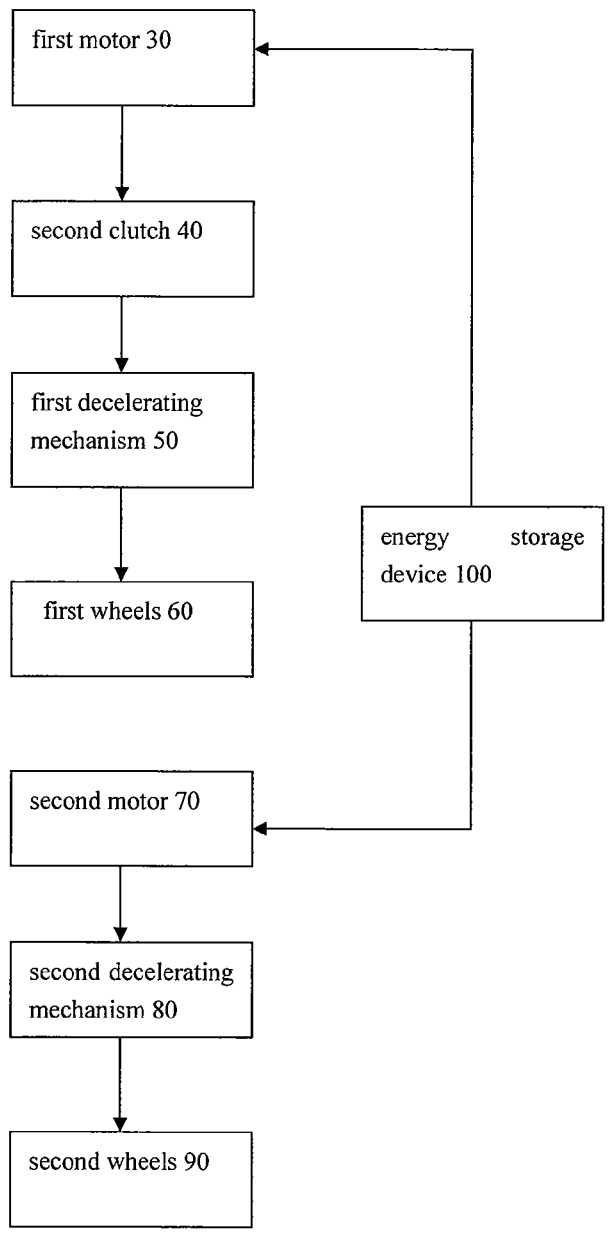
FIG. 15 is a schematic block diagram of a first motor and second motor driving mode of a hybrid power drive system of another embodiment.
Figure 16:
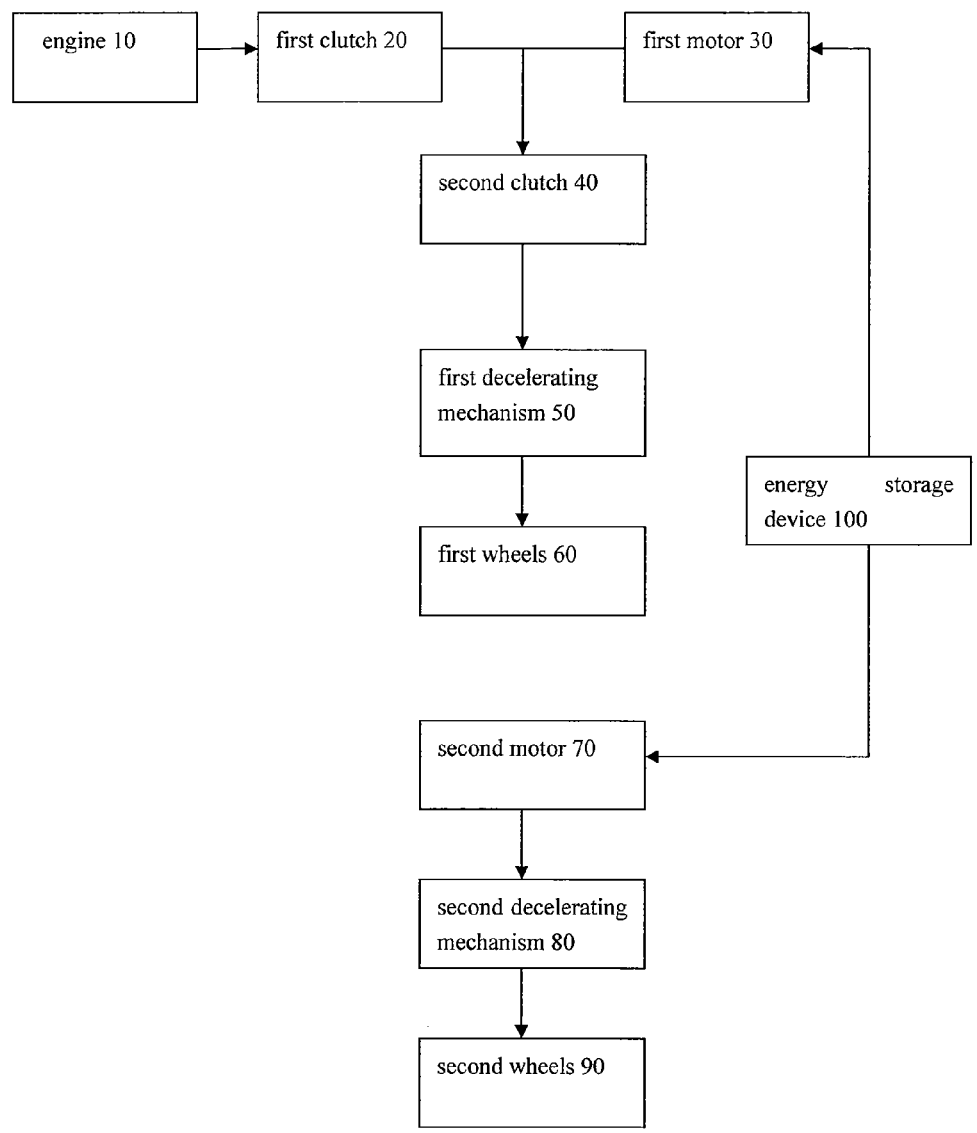
FIG. 16 is a schematic block diagram of an engine and dual motors driving mode of a hybrid power drive system of another embodiment.

The drive system of this embodiment further comprises a self-charging mode that can realize in parking and running, in addition to the drive modes of above embodiment, such as the engine driving mode as shown in FIG. 10, the first motor driving mode as shown in FIG. 11, the engine and first motor driving mode as shown in FIG. 12, the second motor driving mode as shown in FIG. 13, the engine and second motor driving mode as shown in FIG. 14, the first motor and second motor driving mode as shown in FIG. 15 and the engine and dual motors driving mode as shown in FIG. 15.

The difference between this embodiment and above embodiment lies in that, whatever power of the engine 10 or the first motor 30, before it is transferred to at least one first wheels, it is transferred through the second clutch 40 first, then the first decelerating mechanism 50, at last to at least one first wheel 60. To be specific, the power of the engine 10 is transferred to at least one first wheel 60 through the first clutch 20, the second clutch 40 and the first decelerating mechanism 50. The power of the first motor 30 is transferred to at least one first wheel 60 through the second clutch 40 and the first decelerating mechanism 50. Thus, the second clutch 40 is engaged in the engine driving mode, the first motor driving mode, the engine and first motor driving mode, the engine and second motor driving mode, the first motor and second motor driving mode, the engine and dual motors driving mode. Besides, the working mode of other components of the drive system is same as the mode of above embodiment in the same working modes with the above embodiment. Therefore, the detailed description thereof is omitted hereby for clarity and simplicity purposes.

Figure 17:
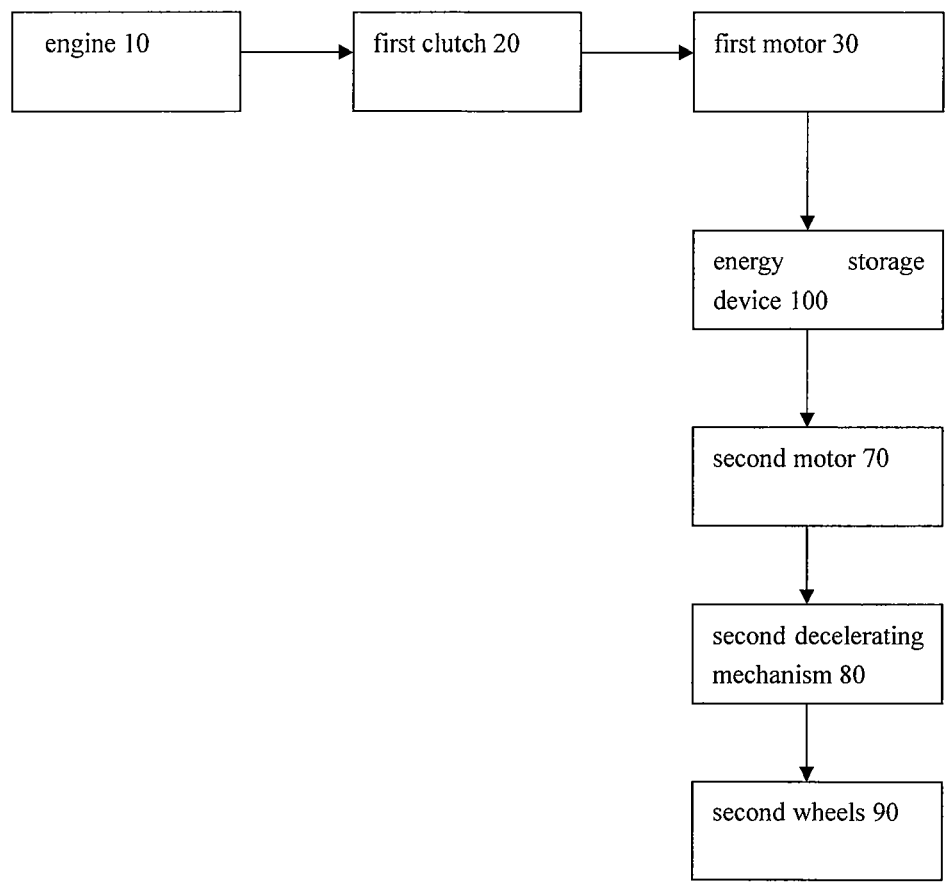
FIG. 17 is a schematic block diagram of an self-charging mode of a hybrid power drive system of another embodiment.

In the self-charging mode as shown in FIG. 17, while in parking, the engine 10 starts, the first clutch 20 is engaged, the second clutch 40 is disengaged. The power of the engine 10 is transferred to the first motor 30 through the first clutch 20, and is transferred into electricity power by the first motor 30, then is transferred to the energy storage device 100 to charge it accordingly. While running, not only the engine 10 starts, the first clutch 20 is engaged, the second clutch 40 is disengaged. The power of the engine 10 is transferred to the first motor 30 through the first clutch 20, and is transferred into electricity power by the first motor 30, then is transferred to the energy storage device 100 to charge it accordingly. But also, meanwhile, the energy storage device 100 provides the electricity power to the second motor 70. The power of the second motor 70 is transferred to at least one second wheel 90 through the second decelerating mechanism 80 to drive the vehicle to run.

In a preferred condition, the drive system further includes an external charging interface coupled to the energy storage device 100 and configured to charge the energy storage device from an external power source. With the interface the energy storage device 100 may be charged directly by the external power, such as using the household power to charge it. By this, the convenience has been improved greatly. This preferred feature may be applied to both embodiments described above.

According to another aspect of the invention, a drive method of a hybrid power drive system is provided. The hybrid power system may be the hybrid power drive system described above of this invention. The drive method comprises the following steps: providing an engine driving mode, providing a first motor driving mode, providing an engine and first motor driving mode, providing a second motor driving mode, providing an engine and second motor driving mode, providing a first motor and second motor driving mode, providing an engine and dual motors driving mode and providing a self-charging mode.

While in the engine driving mode, the vehicle is driven by at least one first wheel 60. The engine 10 is a power resource. The engine 10 starts; the first clutch 20 is engaged; the second clutch 40 (if there is one, same below) is engaged. The power of the engine 10 is transferred to at least one first wheel 60 through the first clutch 20, the second clutch 40 and the first decelerating mechanism 50 to drive the vehicle.

While in first motor driving mode, the vehicle is driven by at least one first wheel 60. The first motor 30 is a power resource. The energy storage device 100 provides electricity power to the first motor 30. The second clutch 40 is engaged. The power of the first motor 30 is transferred to at least one first wheel 60 through the second clutch 40 and the first decelerating mechanism 50 to drive the vehicle.

While in the engine and first motor driving mode, the vehicle is driven by at least one first wheel 60. The engine 10 and the first motor 30 are simultaneously power resources. The engine 10 starts. The first clutch 20 and the second clutch 30 are engaged. The power of the engine 10 is transferred to at least one first wheel 60 through the first clutch 20, the second clutch 40 and the first decelerating mechanism 50 to drive the vehicle. Meanwhile, the energy storage device 100 provides electricity power to the first motor 30. The power of the first motor 30 is transferred to at least one first wheel 60 through the second clutch 40 and the first decelerating mechanism 50 to drive the vehicle.

While in second motor driving mode, the vehicle is driven by at least one second wheel 90. The second motor 70 is a power resource. The energy storage device 100 provides electricity power to the second motor 70. The power of the second motor 70 is transferred to at least one second wheel 90 through the second decelerating mechanism 80 to driven the vehicle.

While in the engine and second motor driving mode, the vehicle is driven by at least one first wheel 60 and/or at least one second wheel 90, namely four-wheel driving. The engine 10 and the second motor 70 are simultaneous power resources. The engine 10 starts. The first clutch 20 and the second clutch 40 are engaged. The power of the engine 10 is transferred to at least one first wheel 60 through the first clutch 20, the second clutch 40 and the first decelerating mechanism 50 to drive the vehicle. Meanwhile, the energy storage device 100 provides electricity power to the second motor 70. The power of the second motor 70 is transferred to at least one second wheel 90 through the second decelerating mechanism 80 to drive the vehicle.

While in the first motor and second motor driving mode, the vehicle is driven by at least one first wheel 60 and/or at least one second wheel 90, namely four-wheels driving. The first motor 30 and the second motor 70 are simultaneous power resources. The energy storage device 100 provides electricity power to the first motor 30 and the second motor 70 at the same time. The second clutch 40 is disengaged. The power of the first motor 30 is transferred to at least one first wheel 60 through the second clutch 40 and the first decelerating mechanism 50 to drive the vehicle. The power of the second motor 70 is transferred to at least one second wheel 90 through the second decelerating mechanism 80 to drive the vehicle.

While in the engine and dual motors driving mode, the vehicle is driven by at least one first wheel 60 and/or at least one second wheel 90, namely four-wheel driving. The engine 10, the first motor 30 and the second motor 70 are simultaneous power resources. The engine 10 starts. The first clutch 20 and the second clutch 40 are engaged. The power of the engine 10 is transferred to at least one first wheel 60 through the first clutch 20, the second clutch 40 and the first decelerating mechanism 50 to drive the vehicle. Meanwhile, the energy storage device 100 provides electricity power to the first motor 30 and the second motor 70 at the same time. The power of the first motor 30 is transferred to at least one first wheel 60 through the second clutch 40 and the first decelerating mechanism 50 to drive the vehicle. The power of the second motor 70 is transferred to the second wheels 90 through the second decelerating mechanism 80 to drive the vehicle.

While in the self-charging mode, and in parking, the engine 10 starts; the first clutch 20 is engaged; the second clutch 40 is disengaged. The power of the engine 10 is transferred to the first motor 30 through the first clutch 20, and is translated into electricity power by the first motor 30, then is transferred to the energy storage device 100 to charge it accordingly. It should be noted that, the second clutch 40 is configured and stays disengaged is to ensure that the power of the engine 10 is totally used to charge the energy storage device 100 and would not be transferred to the first wheels 60, thus the vehicle stays in parking mode.

While the vehicle is running, not only the engine 10 starts, the first clutch 20 is engaged, the second clutch 40 is disengaged, the power of the engine 10 is transferred to the first motor 30 through the first clutch 20, and is transferred into electricity power by the first motor 30, then is transferred to the energy storage device 100 to charge it accordingly. Meanwhile, the energy storage device 100 provides electricity power to the second motor 70. The power of the second motor 70 is transferred to at least one second wheel 90 through the second decelerating mechanism 80 to drive the vehicle. At this time, the second clutch 40 may be engaged also, thus a part of the power of the engine 10 may charge the energy storage device 100, the other part power of the engine 10 may be transferred to at least one first wheel 60 to drive the vehicle.

Figure 18:
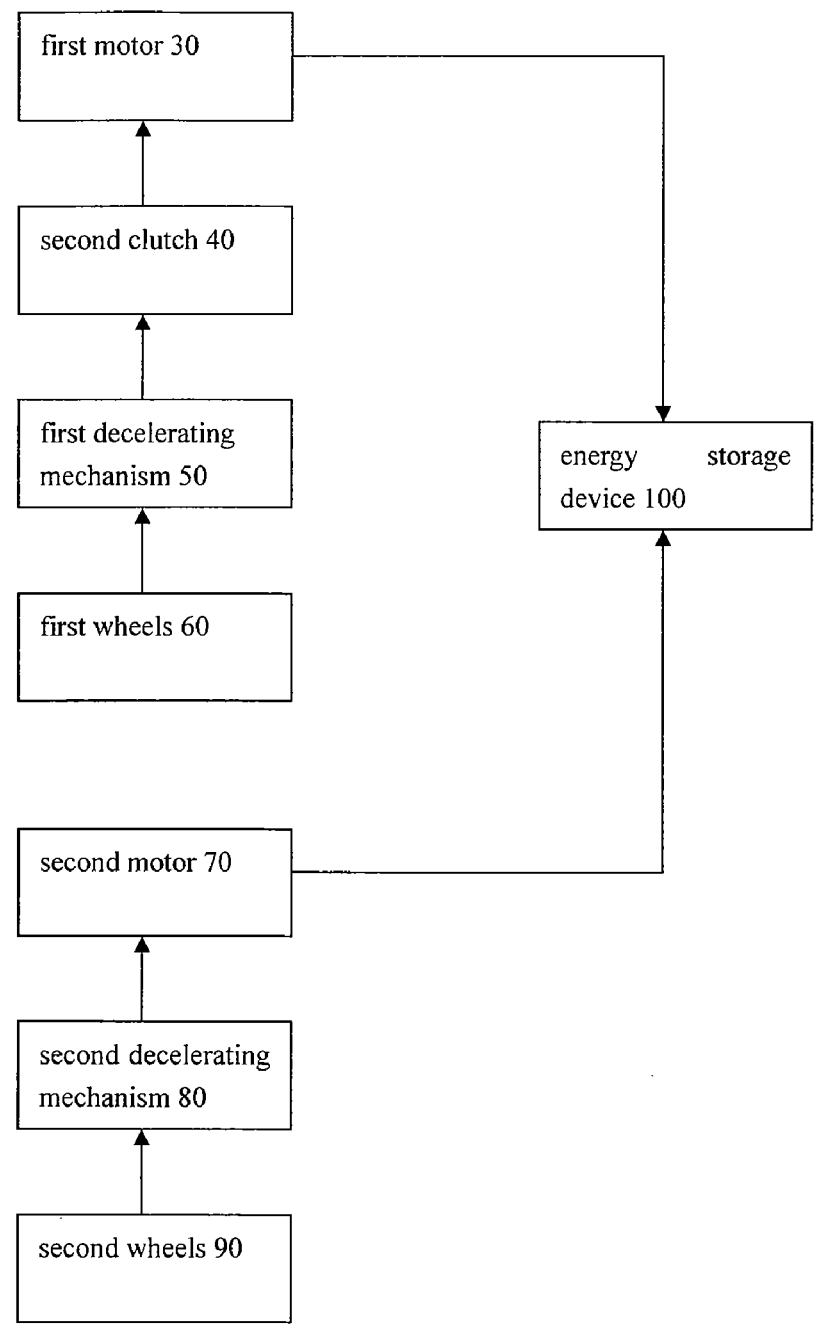
FIG. 18 is a schematic block diagram of an braking mode of a hybrid power drive method of one embodiment.

The drive method of this invention further comprises controlling the drive system in a regenerative braking mode as shown in FIG. 18. While the accelerator panel is loosed, or the braking panel is pushed, the drive system is in the braking mode. The second clutch 40 (if there is one) is engaged, the first motor 30 and/or the second motor 70 enter into braking mode and work as generator. Thus the braking energy fed back from at least one first wheel 60 and/or at least one second wheel 90 is separately transferred to the first motor 30 and/or the second motor 70 through the first decelerating mechanism 50, the second clutch 40 (if there is one) and the second decelerating mechanism 80, then the braking energy is translated into electricity power by the first motor 30 and/or the second motor 70 and is transferred to the energy storage device 100 to charge it accordingly.

Although the preferred embodiments of the present invention have been described above, the present invention is not limited to the above words, those who skilled in this field shall understand that many amendments, replacements or variations may be made according to the present invention, which are all within the protection of the present invention.

We claim:

1. A hybrid power drive system, comprising:
an engine;
a first motor;
a first clutch operatively coupled between the engine and the first motor;
a first decelerating mechanism having an input portion and an output portion, the input portion operatively coupled between the first clutch and the first motor, the input portion configured to receive rotational power from at least one of the first motor and the engine;
the first decelerating mechanism having an output portion operative to drive at least one wheel of a first wheel set;
a second decelerating mechanism having an input portion and an output portion;
a second motor operatively coupled to at least one wheel of a second wheel set through the second decelerating mechanism;
an energy storage device coupled separately to the first motor and to the second motor; and wherein, the engine, the first clutch and the first motor are connected in sequence, and the second decelerating mechanism and the at least one second wheel are connected in sequence; and
wherein the first and second decelerating mechanisms are configured to decelerate a rotational speed of the corresponding output portion relative to the corresponding input portion, wherein a rotation speed of the corresponding input portion is substantially greater than the rotational speed of the corresponding output portion.

2. The drive system of claim 1, wherein when the first clutch is engaged, power from the engine is transferred to the at least one wheel of the first wheel set through the first clutch and the first decelerating mechanism.

3. The drive system of claim 1, wherein the energy storage device provides electrical power to the first motor, and the first motor provides rotational power to the at least one wheel of the first wheel set through the first decelerating mechanism.

4. The drive system of claim 3, wherein the energy storage device provides electrical power to the second motor, and the second motor provides rotational power to the at least one wheel of the second wheel set through the second decelerating mechanism.

5. The drive system of claim 1, wherein the energy storage device provides electrical power to the second motor, and the second motor provides rotational power to the at least one wheel of the second wheel set through the second decelerating mechanism.

6. The drive system of claim 1, further comprising a second clutch operatively coupled between the first clutch and the first motor, and operatively coupled to the first decelerating mechanism.

7. The drive system of claim 6, wherein when the first clutch is engaged and the second clutch is disengaged, rotational power of the engine is transferred to the first motor through the first clutch so that the first motor generates electrical power to charge the energy storage device.

8. The drive device of claim 7, wherein when the energy storage device provides electrical power to the second motor, and the second motor provides rotational power to the at least one wheel of the second wheel set through the second decelerating mechanism.

9. The drive device of claim 6, wherein when the second clutch is engaged,
braking energy feedback from the at least one first wheel is transferred to the first motor by the first decelerating mechanism and the second clutch;
the first motor generates electrical power and charges the energy storage device; braking energy feedback received from the at least one second wheel is transferred to the second motor through the second decelerating mechanism;
and the second motor generates electrical power and charges the energy storage device.

10. The drive system of claim 1, further including an external charging interface coupled to the energy storage device and configured to charge the energy storage device from an external power source.

11. A drive method of a hybrid power drive system, the drive method comprising:
providing an engine driving mode;
providing a first motor driving mode;
providing the engine and first motor driving mode;
providing a second motor driving mode;
providing the engine and second motor driving mode;
providing a first motor and second motor driving mode;
providing the engine and dual motors driving mode; and
driving at least one of first wheels and second wheels in one of a plurality of modes including the engine driving mode, the first motor driving mode, the engine and first motor driving mode, the second motor driving mode, the engine and second motor driving mode, the first motor and second motor driving mode, and the engine and dual motors driving mode,
wherein, in the engine driving mode, the engine provides power to drive at least one first wheel,
wherein, in the first motor driving mode, an energy storage device provides electrical power to a first motor, the first motor driving the at least one first wheel,
wherein, in the engine and first motor driving mode, the energy storage device provides electrical power to the first motor, the engine and the first motor simultaneously driving the at least one first wheel,
wherein, in the second motor driving mode, the energy storage device provides electrical power to the second motor, the second motor driving at least one second wheel,
wherein, in the engine and second motor driving mode, the energy storage device provides electrical power to the second motor, the engine and the second motor simultaneously driving the at least one second wheel,
wherein, in the first motor and second motor driving mode, the energy storage device provides electrical power to both the first motor and the second motor, the first motor and the second motor simultaneously driving the at least one first wheel and the at least one second wheel,
wherein in the engine and dual motors driving mode, the energy storage device provides electrical power to the first and second motors, the engine, the first motor and the second motor simultaneously driving the at least one first wheel and the at least one second wheel.

12. The drive method of claim 11,
wherein in the engine driving mode, a first clutch is engaged and the engine provides rotational power to the at least one first wheel through the first clutch and a first decelerating mechanism;
wherein in the first motor driving mode, the energy storage device provides electrical power to the first motor, and the first motor provides rotational power to at least one first wheel through the first decelerating mechanism;
wherein in the engine and first motor driving mode, the first clutch is engaged, the engine provides rotational power to the at least one first wheel through the first clutch and the first decelerating mechanism, the energy storage device provides electrical power to the first motor, and the first motor provides rotational power to the at least one first wheel through the first decelerating mechanism;
wherein in the second motor driving mode, the energy storage device provides electrical power to the second motor, and the second motor provides rotational power to the at least one second wheel through a second decelerating mechanism;
wherein in the engine and second motor driving mode, the first clutch is engaged, the engine provides rotational power to the at least one first wheel through the first clutch and the first decelerating mechanism, the energy storage device provides electrical power to the second motor, and the second motor provides rotational power to the at least one second wheel through the second decelerating mechanism;
wherein in the first motor and second motor driving mode, the energy storage device provides electrical power to the first motor, the first motor provides rotational power to the at least one first wheel through the first decelerating mechanism, the energy storage device provides electrical power to the second motor, and the second motor provides rotational power to the at least one second wheel through the second decelerating mechanism; and
wherein in the engine and dual motor driving mode, the first clutch is engaged, the engine provides rotational power to the at least one first wheel through the first clutch and the first decelerating mechanism, the energy storage device provides electrical power to the first motor, the first motor provides rotational power to the at least one first wheel through the first decelerating mechanism, the energy storage device provides electrical power to the second motor, and the second motor provides rotational power to the at least one second wheel through the second decelerating mechanism.

13. The drive method of claim 11, wherein the drive system further comprising a second clutch operatively coupled between the first clutch and the first motor, and operatively coupled to the first decelerating mechanism, the drive method further comprising controlling the drive system in a self-charging mode.

14. The drive method of claim 13, wherein when the drive system is in a self-charging mode, the first clutch is engaged, the second clutch is disengaged, rotational power of the engine is provided to the first motor through the first clutch, and the first motor generates electrical power to charge the energy storage device.

15. The drive method of claim 14, wherein the energy storage device provides electrical power to the second motor, and the second motor provides rotational power to the at least one second wheel through the second decelerating mechanism.

16. The drive method of claim 13, further comprising controlling the drive system in a regenerative braking mode, wherein
the second clutch is engaged;
braking energy feedback from the at least one first wheel is transferred to the first motor by the first decelerating mechanism and the second clutch;

the first motor generates electrical power and charges the energy storage device;

braking energy feedback received from the at least one second wheel is transferred to the second motor through the second decelerating mechanism;

and the second motor generates electrical power and charges the energy storage device.

17. The drive method of claim 11, wherein the drive system further includes an external charging interface coupled to the energy storage device and configured to charge the energy storage device from an external power source.

* * * * *